(12) United States Patent
Sedelnikov

(10) Patent No.: US 8,384,800 B2
(45) Date of Patent: Feb. 26, 2013

(54) METHODS OF ACQUIRING IMAGES

(75) Inventor: Ilya Sedelnikov, Beer-Sheva (IL)

(73) Assignee: Samsung Electronics Co., Ltd., Gyeonggi-do (KR)

(*) Notice: Subject to any disclaimer, the term of this patent is extended or adjusted under 35 U.S.C. 154(b) by 115 days.

(21) Appl. No.: 12/882,589

(22) Filed: Sep. 15, 2010

(65) Prior Publication Data

US 2011/0122304 A1    May 26, 2011

Related U.S. Application Data

(60) Provisional application No. 61/272,949, filed on Nov. 23, 2009.

(51) Int. Cl.
*H04N 9/73* (2006.01)

(52) U.S. Cl. ..................... 348/226.1; 348/362

(58) Field of Classification Search .... 348/226.1–229.1, 348/221.1
See application file for complete search history.

(56) References Cited

U.S. PATENT DOCUMENTS

| | | | |
|---|---|---|---|
| 5,264,940 A * | 11/1993 | Komiya et al. | 348/298 |
| 7,202,897 B2 | 4/2007 | Suzuki | |
| 7,911,505 B2 * | 3/2011 | Pillman et al. | 348/226.1 |
| 2006/0290797 A1* | 12/2006 | Tanaka et al. | 348/297 |
| 2007/0146501 A1 | 6/2007 | Matsuoka | |
| 2010/0097493 A1* | 4/2010 | Asoma | 348/229.1 |

FOREIGN PATENT DOCUMENTS

| | | |
|---|---|---|
| KR | 10-2007-0022529 | 2/2007 |
| KR | 10-2007-0027957 | 3/2007 |

* cited by examiner

*Primary Examiner* — Chieh M Fan
*Assistant Examiner* — Wesley J Chiu
(74) *Attorney, Agent, or Firm* — Harness, Dickey & Pierce, P.L.C.

(57) ABSTRACT

Example embodiments are directed to time division of an exposure for image acquisition. More specifically, example embodiments reduce flicker in images taken with an image sensor, such as a CMOS image sensor. At least one example embodiment discloses a method of acquiring an image with an image sensor. The method includes determining, by a controller of the image sensor, an exposure time for image acquisition and dividing, by the controller, the exposure time into at least two active time intervals. The at least two active time intervals are separated by at least one inactive time interval.

12 Claims, 21 Drawing Sheets

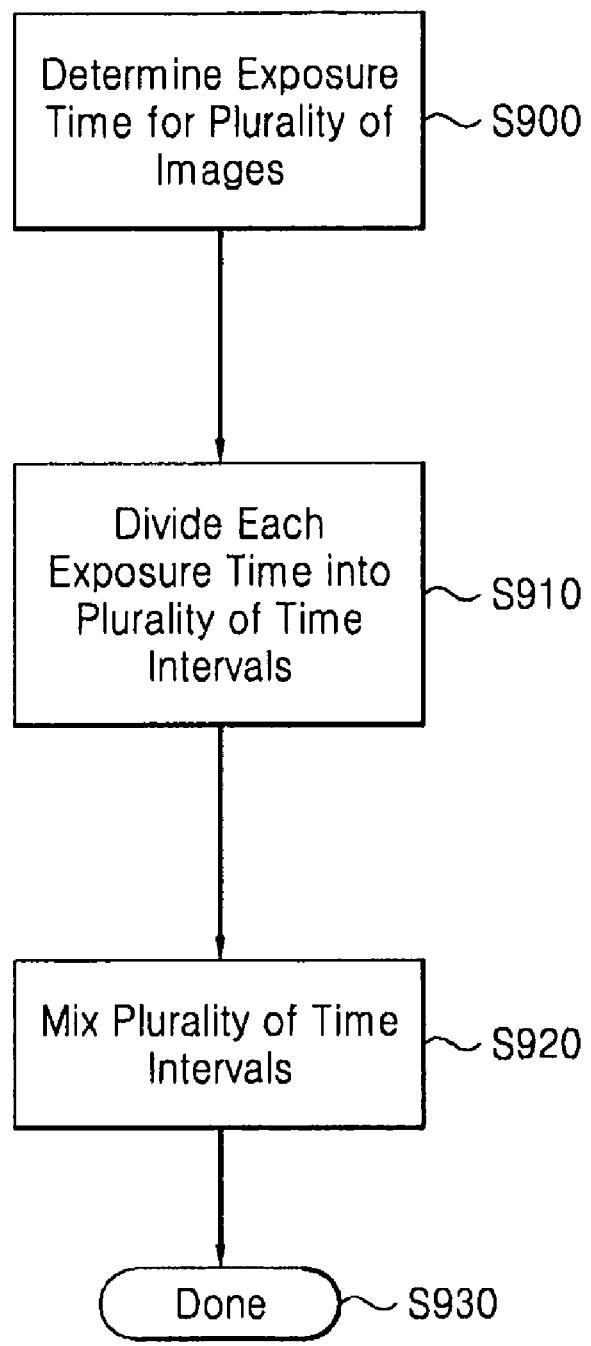

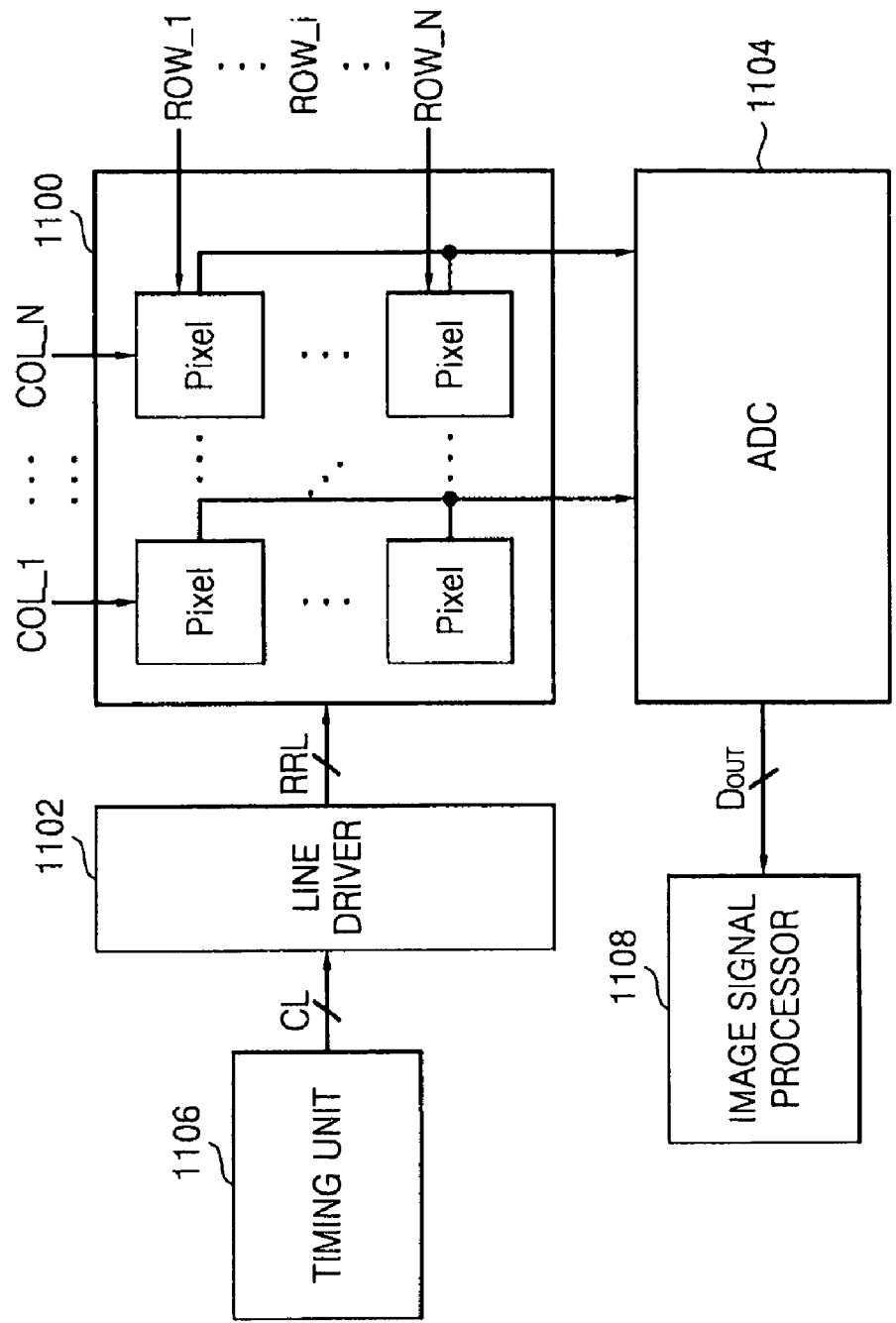

METHODS OF ACQUIRING IMAGES

PRIORITY STATEMENT

This application claims the benefit of U.S. Provisional Application No. 61/272,949, filed on Nov. 23, 2009.

BACKGROUND

Image sensors include pixels. A pixel accumulates charge when illuminated by light. In conventional image acquisition methods, the pixel accumulates a charge in an analog circuit for a continuous period of time called an exposure time. The accumulated charge is transferred to an analog-to-digital (A/D) converter, which outputs a digital value for that pixel.

The image sensor outputs a two-dimensional array of digital values. Each digital value is obtained by the pixels in the image sensor. One type of image sensor is a charge-coupled device (CCD). In CCD image sensors, exposure of all pixels starts simultaneously and ends simultaneously.

In CMOS image sensors, exposure of all pixels in a same row starts simultaneously and ends simultaneously. In other image sensors, exposure of all pixels starts at the same time, but ends at different times.

What is common to conventional image sensors is that the digital value of a pixel is obtained as a result of A/D conversion of a charge that was accumulated during a continuous time interval of exposure.

FIG. 1 illustrates a conventional method of exposing a pixel to acquire an image. FIG. 1 illustrates an exposure time $T_{Exposure}$ of 10 ms. The exposure time $T_{Exposure}$ is continuous and, thus, is not interrupted. A value of a pixel is an accumulated charge during the continuous time interval of 10 ms. The accumulated charge is shown in a shaded region in FIG. 1.

Artifacts often result from conventional image acquisition methods, such as multiple exposure (ME) imaging and capturing images with a CMOS sensor under artificial illumination.

Multiple exposure (ME) allows production of an image at a higher dynamic range than what a sensor produces from a single capture. ME takes multiple captures of a same scene using different exposure times and then combines resulting images together into a wide dynamic range image. The process of capturing these images may be referred to as an "ME session". Any motion in the captured scene during an ME session results in a (spatial) inconsistency between captured images, since, in a conventional model of image acquisition, each image is captured during the continuous time interval and images are taken in a sequence. This introduces significant time delay between exposure starting times for different images captured during the ME session. When separate images are combined into a wide dynamic range image, this inconsistency results in so-called "motion artifacts".

A common method for image acquisition using a CMOS sensor is an electronic rolling shutter approach. Using this approach, exposure for each line of the CMOS sensor starts with a time delay relative to the previous line, and the readout of each line is delayed by the same amount of time relative to the previous line. The intensity of artificial illumination sources powered by alternating current changes over time. If the alternating current (AC) frequency is 50 Hz, the fluorescent lamp produces a waveform with a period of 100 Hz.

FIG. 2A illustrates a waveform of a "daylight" fluorescent lamp as measured with a light sensor and an oscilloscope. The Y-axis is in units of 20 mV and the X-axis is in units of 0.5 ms. The waveform can be represented as the sum of DC and AC components with an AC component that satisfies two criteria: (1) the waveform is close to periodic and (2) an integral over one period of the wave (e.g., 10 ms) is close to zero. The waveform is approximated by $$f(t) = C_1 + C_2 \sin\left(\frac{2\pi}{T}t + \phi\right) \tag{1}$$

where $C_1$ equals approximately 400 mV and $C_2$ approximately equals 200 mV.

When capturing a scene illuminated by an artificial illumination source (with a non-zero AC component) with exposure not equal to a multiple of a flickering period, the integral of the AC component over a continuous exposure interval $[t_0, t_1]$ less than the period of the AC component depends on the value of an AC component phase, $$\frac{2\pi}{T}t + \phi \tag{2}$$

at time $t_0$.

FIG. 2B illustrates a conventional approach to ME. As shown, each of a first image (Image 1) and a second image (Image 2) are collected during continuous intervals. The first and second images are then mixed to develop a wide dynamic range image.

In the conventional acquisition model, the exposure time interval is continuous, so when the exposure of each line of the image starts at different times, the AC component contributes different values to each line. Therefore, capturing a scene illuminated by an artificial illumination source (with a non-zero AC component) with exposure not equal to a multiple of a flickering period results in a flicker artifact visible on captured images in the form of alternating horizontal bars of a higher and lower brightness.

The flicker artifact is usually overcome in CMOS imagers by forcing an exposure time to be a multiple of the flicker period. In this case, the sinusoidal component does not affect the final image, since the integral of an AC component over an integer number of periods is close to zero. However, in many situations, exposure time that is less than a flicker period or not equal to the flicker period has to be chosen, for example to avoid saturation in the image.

SUMMARY

Example embodiments are directed to time division of an exposure for image acquisition. At least one example embodiment discloses a method of acquiring images with an image sensor where the digital value of a pixel of a single image is obtained based on a charge that was accumulated during multiple continuous time intervals. The time intervals where charges are collected may be referred to as "active" time intervals. In the context of acquisition of a single image, the time axis is divided into a number of intervals. Examples of intervals include:

a. "Active" intervals;
b. Time intervals that lay between "active" intervals, which may be referred to as "inactive" in the context of current image. During "inactive" time intervals the charge is either not collected, or collected but not used in forming digital pixel values of current image;
c. Time before the start of exposure of the first "active" interval. This interval or any of its subintervals may be considered "inactive" in the context of current image; and d. Time after the end of exposure of last "active" interval. This interval or any of its subintervals may be considered "inactive" in the context of current image.

Therefore, the time between the start of exposure of the first "active" interval and the end of exposure of the last "active" interval can be divided into "active" intervals, during which the charge is collected to be later used in representing the image, and "inactive" time intervals during which the charge is either not collected or collected, but not used in forming digital pixel values of current image.

When talking about acquisition of multiple images by the same sensor, the same interval may be "active" for one image, but at the same time "inactive" for another image.

The method includes determining, by a controller of the image sensor, an exposure time for image acquisition and dividing, by the controller, the exposure time into a number of time intervals.

At least another example embodiment provides a method of acquiring a plurality of images in an image sensor. The method includes determining, by a controller of the image sensor, an exposure time for each of the plurality of images, dividing, by the controller, each exposure time into a plurality of time intervals and mixing, by the controller, the plurality of time intervals.

Some example embodiments disclose a method of acquiring an image of a physical object with an image sensor. The method includes determining an exposure time for image acquisition, dividing the exposure time into a number of (active) time intervals and acquiring charges representing the physical object during active time intervals.

At least one example embodiment discloses a method of acquiring a plurality of images of a physical object with an image sensor. The method includes determining an exposure time for each of the plurality of images, dividing each exposure time into a plurality of time intervals, mixing the plurality of time intervals, and acquiring charges representing the physical object during the plurality of time intervals.

BRIEF DESCRIPTION OF THE DRAWINGS

Example embodiments will be more clearly understood from the following detailed description taken in conjunction with the accompanying drawings. FIGS. 1-13 represent non-limiting, example embodiments as described herein.

FIG. 1 illustrates a conventional method of exposing a pixel to acquire an image;

FIG. 4 illustrates an accumulated charge for a pixel according to example embodiments;

FIG. 5 illustrates an example embodiment of accumulated charge over a flicker period and an exposure time;

FIG. 6 illustrates a subdivision of an exposure time into eight active time intervals according to an example embodiment;

FIG. 9A illustrates a method of acquiring a plurality of images in an image sensor according to an example embodiment;

FIG. 10 illustrates an example embodiment where a number of a plurality of images is two;

FIG. 11 illustrates a CMOS image sensor;

FIG. 13 illustrates an electronic system according to an example embodiment.

DETAILED DESCRIPTION

Figure 1:
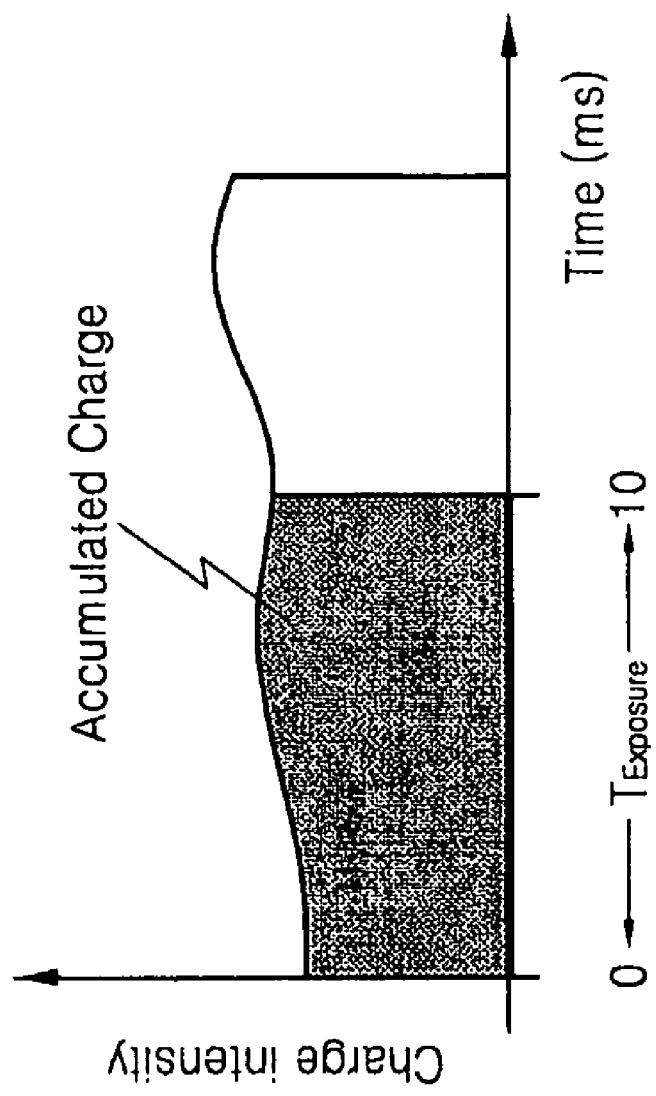
Figure 2A:
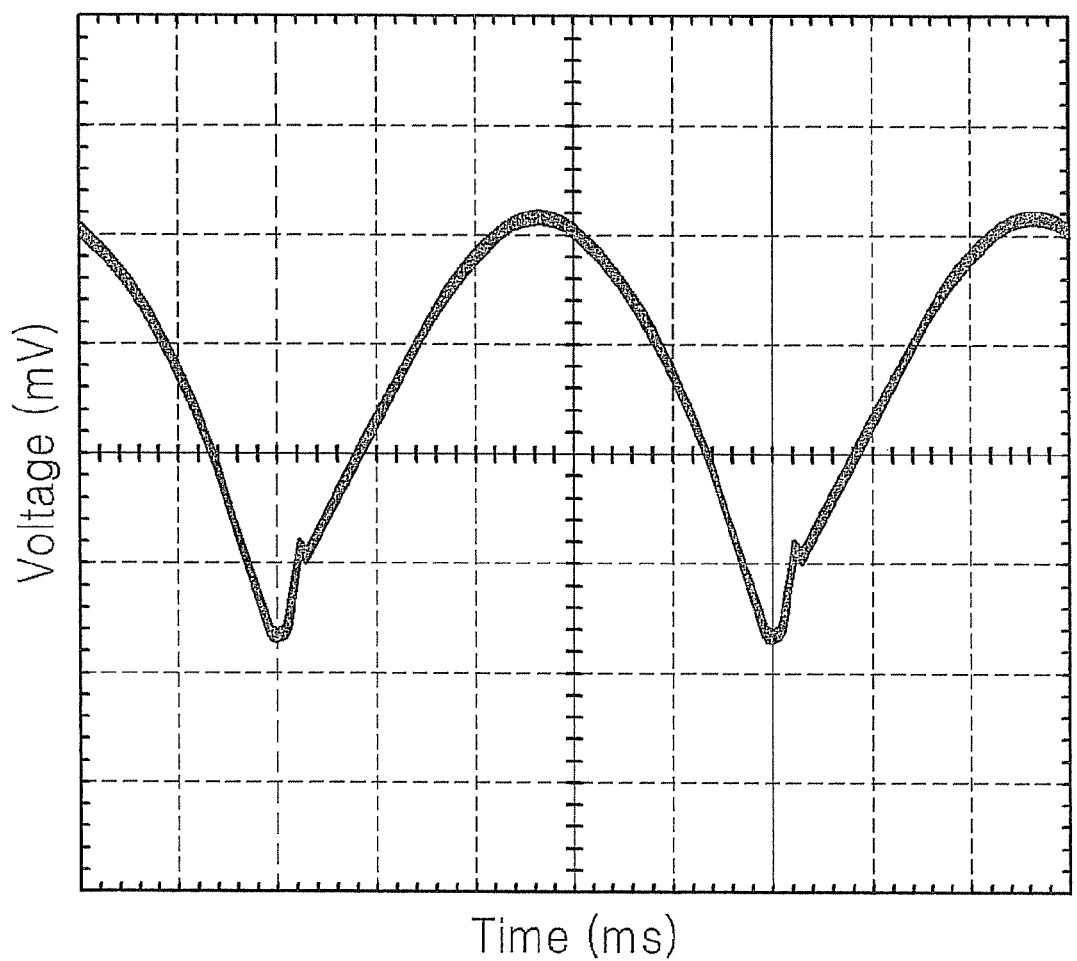
FIG. 2A illustrates a waveform of a "daylight" fluorescent lamp as measured with a light sensor and an oscilloscope.
Figure 2B:
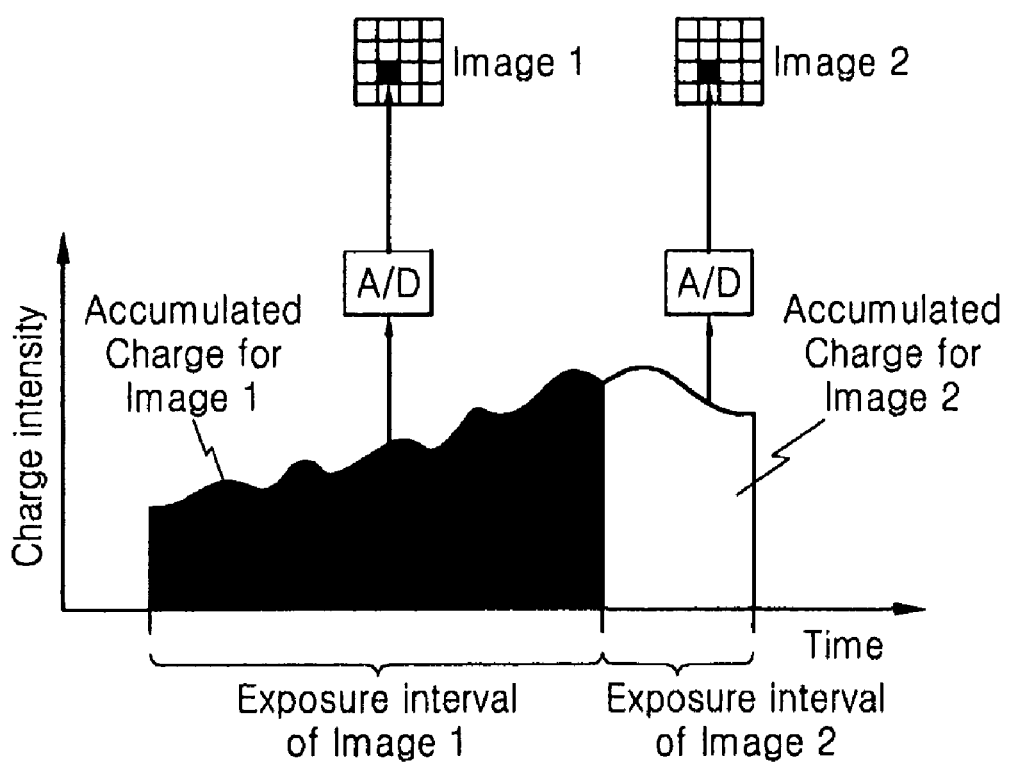
FIG. 2B illustrates a conventional ME method.

Example embodiments will now be described more fully with reference to the accompanying drawings. Many alternate forms may be embodied and example embodiments should not be construed as limited to example embodiments set forth herein. In the drawings, the thicknesses of layers and regions may be exaggerated for clarity, and like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments disclose time-division image acquisition in which a digital value of a pixel corresponds to a charge accumulated during multiple time intervals (active time intervals) that may have gaps between them (inactive time intervals). During "inactive" time intervals the charge is either not collected, or collected but not used in forming digital pixel values of current image. Example embodiments allow for acquisition of images with exposures shorter than or not equal to an integer multiple of the flicker period without flicker artifact or with a significantly reduced flicker artifact.

Additionally, example embodiments provide methods of capturing a double (or multiple) exposure image using time-division image acquisition. Example embodiments allow for production of a wide dynamic range image with significantly reduced motion artifact.

FIG. 11 illustrates an architecture for a complementary-metal-oxide-semiconductor (CMOS) image sensor.

Referring to FIG. 11, a timing unit or circuit 1106 controls a line driver 1102 through one or more control lines CL. In one example, the timing unit 1106 causes the line driver 1102 to generate a plurality of read and reset pulses. The line driver 1102 outputs the plurality of read and reset pulses to a pixel array 1100 on a plurality of read and reset lines RRL.

The pixel array 1100 includes a plurality of pixels P arranged in an array of rows ROW_1-ROW_N and columns COL_1-COL_N. Each of the plurality of read and reset lines RRL corresponds to a row of pixels P in the pixel array 1100. In FIG. 11, each pixel P may be an active-pixel sensor (APS), and the pixel array 1100 may be an APS array.

In more detail with reference to example operation of the image sensor in FIG. 11, read and reset pulses for an ith row ROW_i (where i={1, ..., N}) of the pixel array 1100 are output from the line driver 1102 to the pixel array 1100 via an ith of the read and reset lines RRL. In one example, the line driver 1102 applies a reset signal to the ith row ROW_i of the pixel array 1100 to begin an exposure period. After a given, desired or predetermined exposure time, the line driver 1102 applies a read signal to the same ith row ROW_i of the pixel array to end the exposure period. The application of the read signal also initiates reading out of pixel information (e.g., exposure data) from the pixels P in the ith row ROW_i.

The analog to digital converter (ADC) 1104 converts the output voltages from the ith row of readout pixels into a digital signal (or digital data). The ADC 1104 may perform this conversion either serially or in parallel. An ADC 1104 having a column parallel-architecture converts the output voltages into a digital signal in parallel. The ADC 1104 then outputs the digital data (or digital code) DOUT to a next stage processor such as an image signal processor (ISP) 1108, which processes the digital data to generate an image. In one example, the ISP 1108 may also perform image processing operations on the digital data including, for example, gamma correction, auto white balancing, application of a color correction matrix (CCM), and handling chromatic aberrations.

Figure 12A:
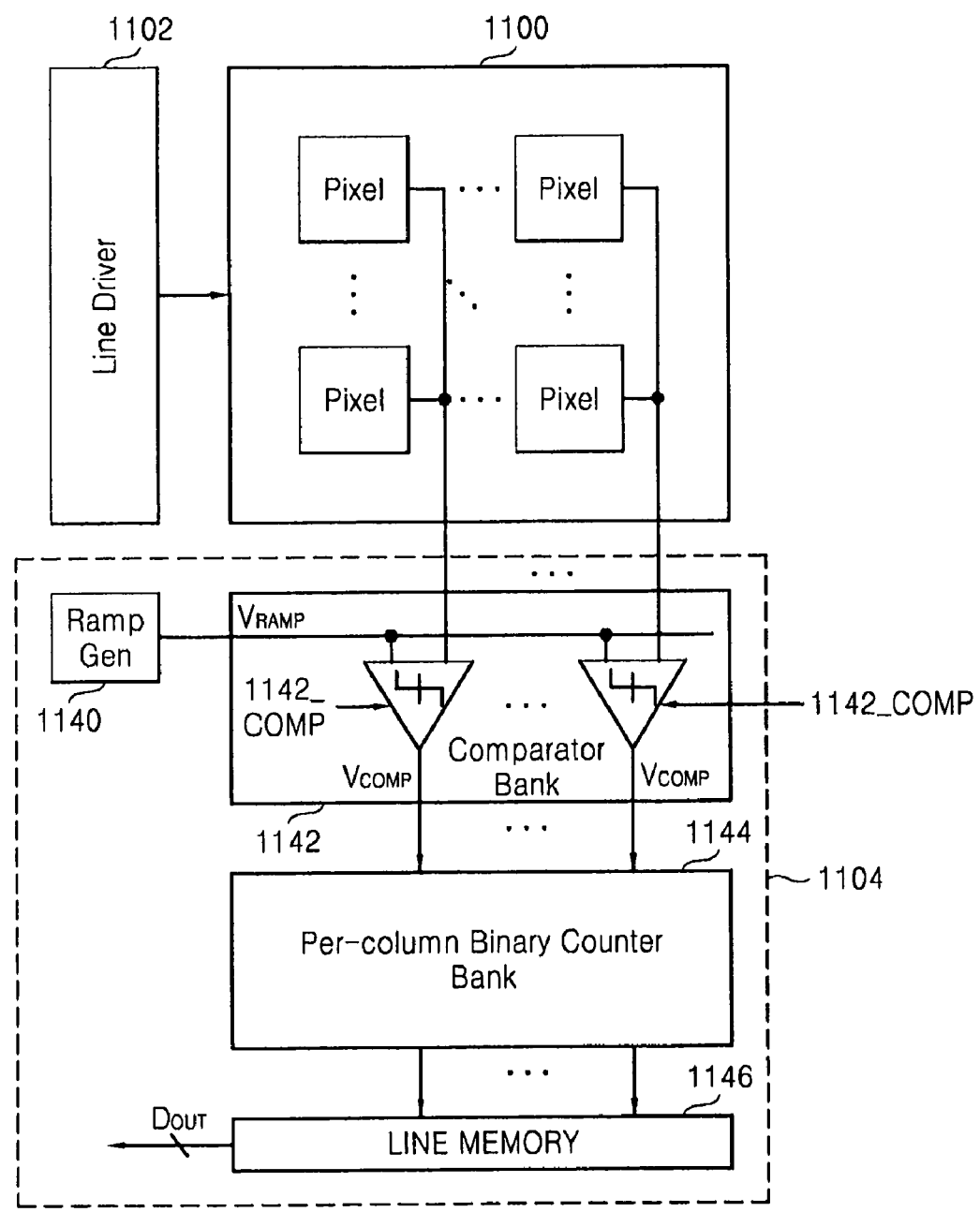
FIGS. 12A and 12B illustrate analog-to-digital converters.
Figure 12B:
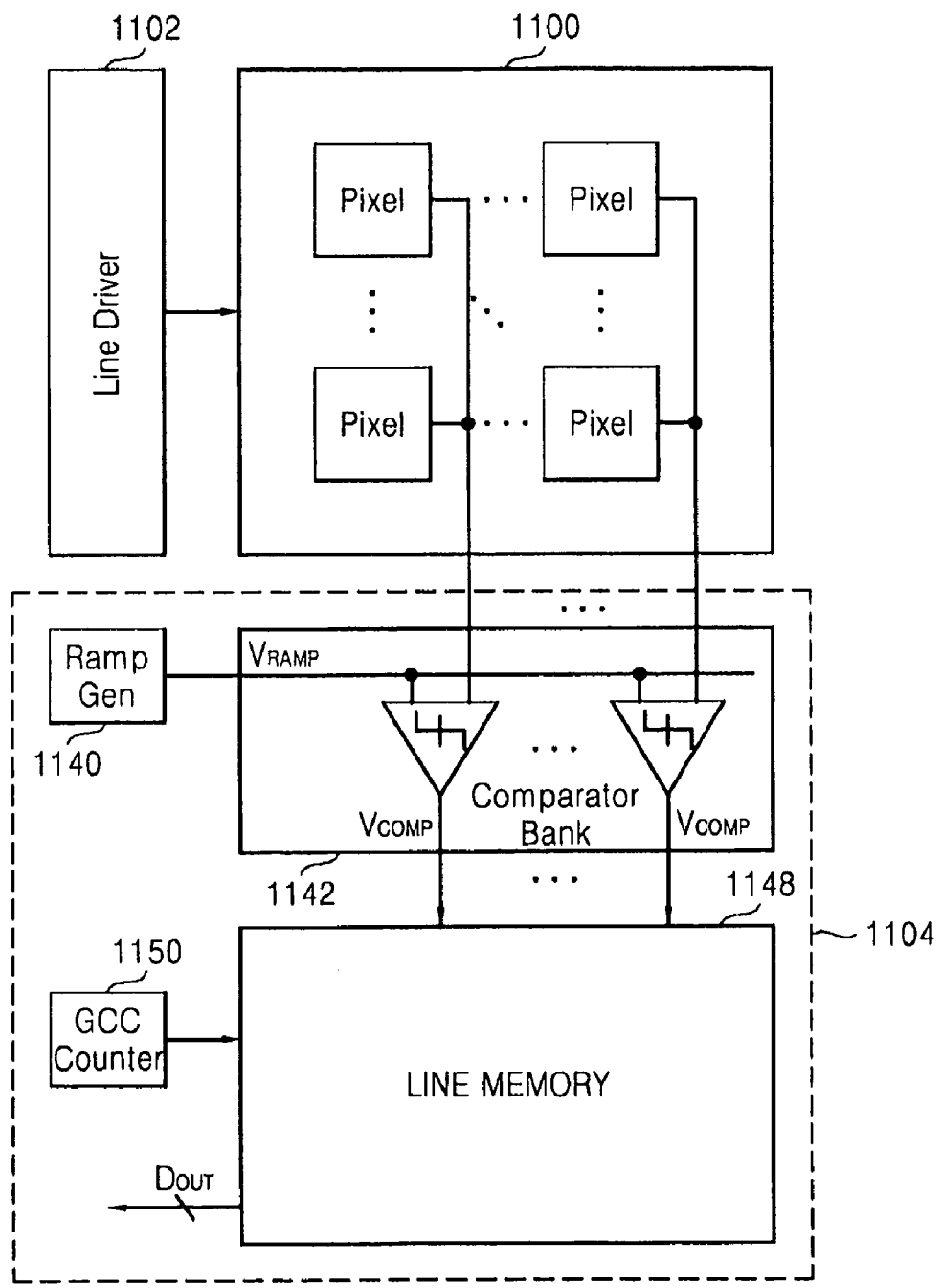

FIGS. 12A and 12B show example ADCs in more detail.

Referring to FIG. 12A, a ramp generator 1140 generates a reference voltage (or ramp signal) VRAMP and outputs the generated reference voltage VRAMP to the comparator bank 1142. The comparator bank 1142 compares the ramp signal VRAMP with each output from the pixel array 1100 to generate a plurality of comparison signals VCOMP.

In more detail, the comparator bank 1142 includes a plurality of comparators 1142_COMP. Each of the plurality of comparators 1142_COMP corresponds to a column of pixels P in the pixel array 1100. In example operation, each comparator 1142_COMP generates a comparison signal VCOMP by comparing the output of a corresponding pixel P to the ramp voltage VRAMP. The toggling time of the output of each comparator 1142_COMP is correlated to the pixel output voltage.

The comparator bank 1142 outputs the comparison signals VCOMP to a counter bank 1144, which converts the comparison signals VCOMP into digital output signals.

In more detail, the counter bank 1144 includes a counter for each column of the pixel array 1100, and each counter converts a corresponding comparison signal VCOMP into a digital output signal. A counter of the counter bank 1144 according to example embodiments will be discussed in more detail later. The counter bank 1044 outputs the digital output signals to a line memory 1146. The digital output signals for an ith row ROW_i of the pixel array is referred to as digital data.

The line memory 1146 stores the digital data from the counter bank 1144 while output voltages for a new row of pixels are converted into digital output signals.

Referring to FIG. 12B, in this example the comparator 1142 outputs the comparison signals VCOMP to the line memory 1148 as opposed to the binary counter bank 1144 shown in FIG. 12A. Otherwise, the ramp generator 1140 and the comparator bank 1142 are the same as the ramp generator 1140 and comparator bank 1142 described above with regard to FIG. 11.

A gray code counter (GCC) 1150 is coupled to the line memory 1148. In this example, the GCC 1150 generates a sequentially changing gray code. The GCC 1150 may receive an output from a frequency divider (not shown).

The line memory 1148 stores the sequentially changing gray code at a certain time point based on the comparison signals VCOMP received from the comparator bank 1142. The stored gray code represents the intensity of light received at the pixel or pixels.

Figure 3A:
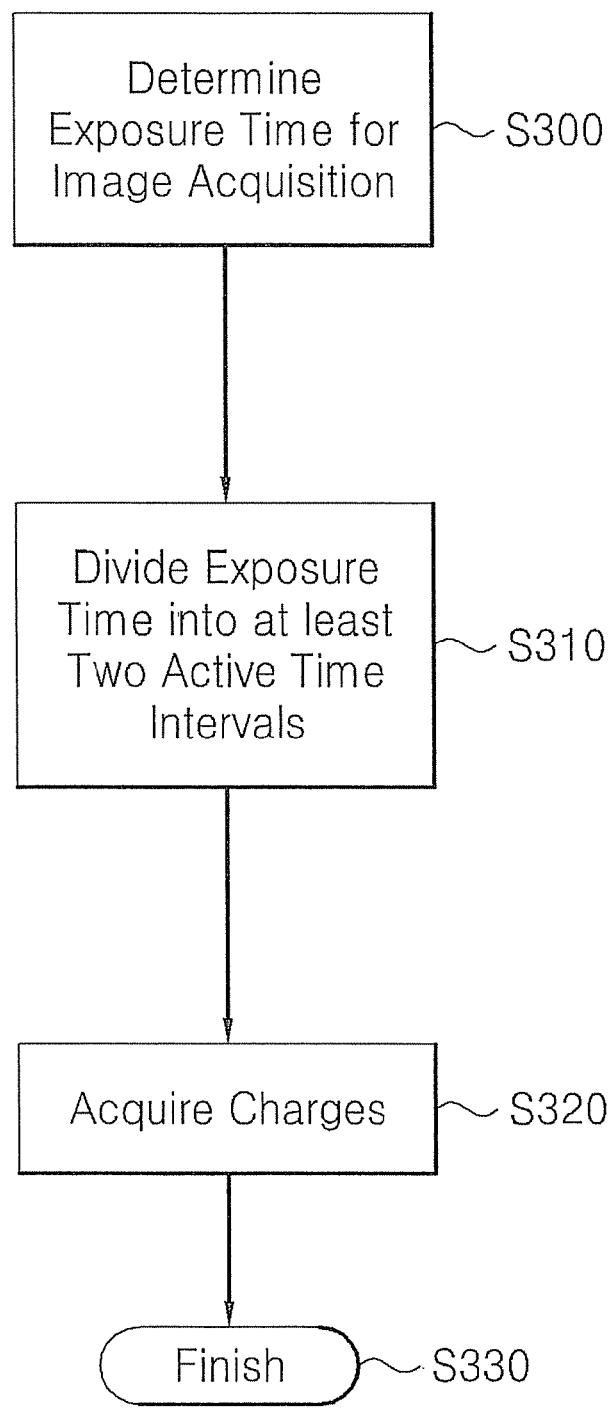
FIG. 3A illustrates a method of acquiring an image with an image sensor according to an example embodiment.

FIG. 3A illustrates a method of acquiring an image with an image sensor. The method shown in FIG. 3A reduces flicker artifact (e.g., dark stripes) in image sensors such as CMOS imagers. While CMOS imagers are used as an example, it should be understood that example embodiments may be implemented using any sensor the exhibits artifacts resulting from a difference in flicker phase between pixels at a starting moment of pixel exposure. The method illustrated in FIG. 3A may cancel a dependence on flicker phase and, therefore, reduce flicker artifact.

The image sensor may include a set of per-pixel analog accumulators that accumulate charge or a digital accumulator that accumulates digitized values acquired during one or multiple exposure intervals.

At step S300, a controller for an image sensor determines an exposure time for image acquisition. Alternatively, the exposure time may be programmed externally. The exposure time may or may not be a multiple of a flicker period. The exposure time may be shorter than, greater than or equal to the flicker period.

Once the exposure time is determined, the controller divides the exposure time into at least two active time intervals at step S310. The two active time intervals may be separated by at least one inactive time interval. The active time intervals are determined by the controller so that an integration of an AC component of the flicker signal over the active time intervals is equal to or close to zero. More specifically, the controller determines the active time intervals to cancel out the AC component of an illumination source.

The active time intervals may be equal or unequal. Given a flicker period T and an exposure time X, the controller computes a configuration of intervals during which the pixel collects charge should be collected in order to reduce the flicker artifact in the acquired image.

Given the flicker period T and the exposure time X, the controller determines a smallest integer number K that satisfies the inequality, $$K*T \geq X \qquad (3)$$

The controller then determines a number of active time intervals N during which the charge is collected by the pixel. Subdivision of the charge integration time into multiple intervals by the controller may reduce signal-to-noise ratio (SNR) of the final pixel value (accumulated charge). The number of active time intervals N may depend on specific sensor architecture. Denoting the time when the exposure of a given pixel starts by $t_0$, the controller determines active time intervals during which the charge is collected for a given image pixel using the formula $$\left[ t_0 + \frac{KT}{N} i, t_0 + \frac{KT}{N} i + \frac{X}{N} \right] \qquad (4)$$

where $i \in [0, \ldots, N-1]$. The charge collected between these intervals is discarded.

The above notwithstanding, it is possible to select not only the smallest but any number K that satisfies the inequality of equation (3). Flicker artifacts will still be reduced.

It should be understood that different configurations of time intervals that allow for a flicker reduction may exist. Example embodiments should therefore not be limited by the above described embodiment.

Once the controller divides the exposure time into at least two active time intervals, each pixel of the image sensor acquires charges during the active time intervals at step S320. During inactive time intervals, each pixel may either not collect charges or may collect charges and discard the charges acquired during the at least one inactive time interval. Once the exposure time has expired and the charge has been accumulated by the pixel, the method is finished at step S330.

Figure 3B:
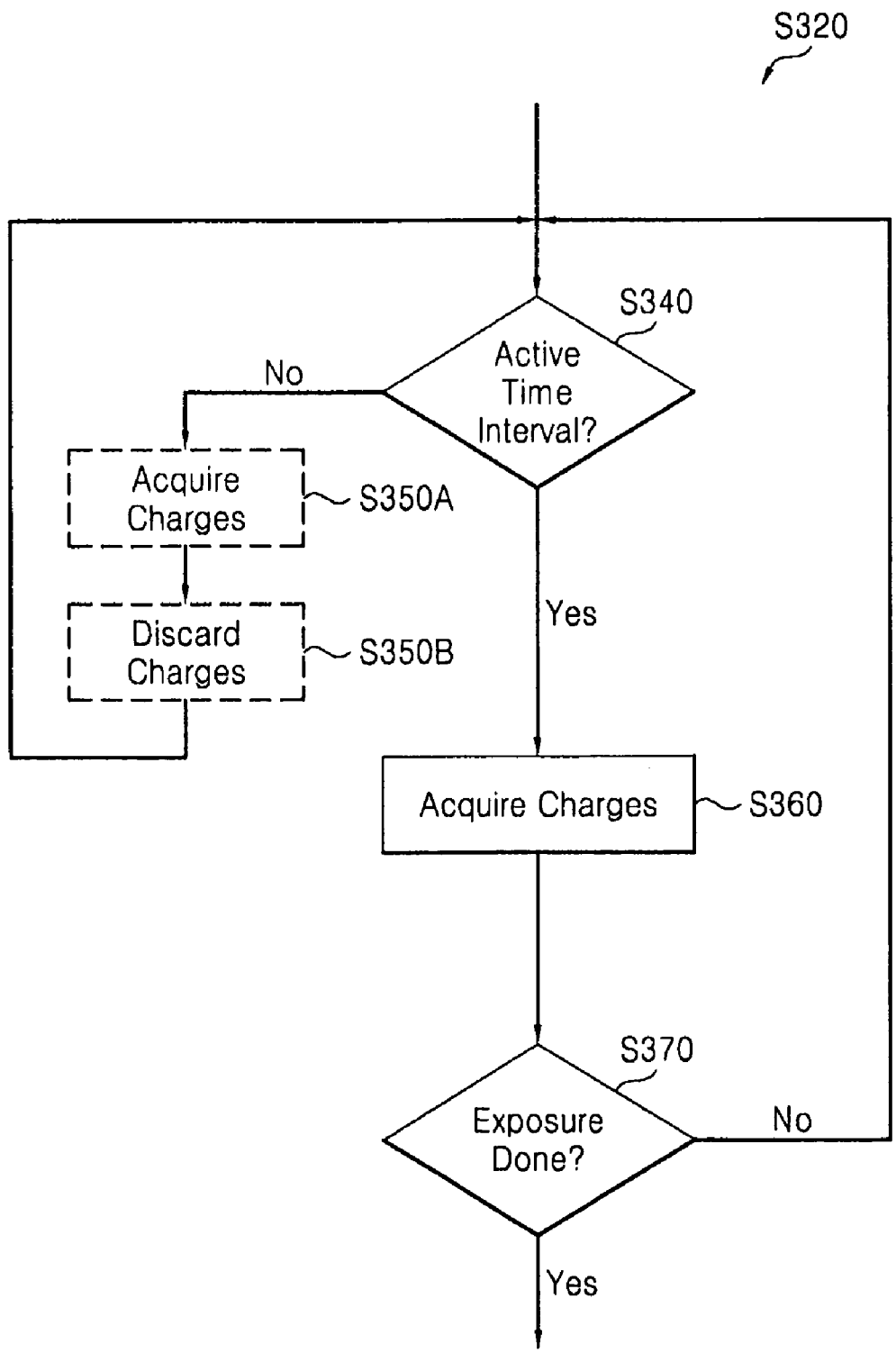
FIG. 3B illustrates an example embodiment of a step shown in FIG. 3A according to an example embodiment.

FIG. 3B illustrates an example embodiment of step S320 in more detail.

Once the controller divides the exposure time into at least two active time intervals at step S310, the controller determines whether an interval in the exposure time is an active time interval at step S340. If the time interval is inactive, the pixel may not acquire charges and the method returns to step S340. Instead of not acquiring charges, the pixel may instead acquire charges at step S350A and discard the acquired charges at step S350B. Once the charges are discarded at step S350B, the method returns to step S340.

If the controller determines that the time interval is an active time interval at step S340, the pixel accumulates charges at step S360. When the time interval ends, the charge accumulated in the pixel is transferred to an accumulator unit and the controller determines whether the exposure time is finished at step S370. If the exposure is finished at step S370 then the method proceeds to step S330, where the method of FIG. 3A is done. If the controller determines that the exposure is not done, the method proceeds to step S340.

Figure 4:
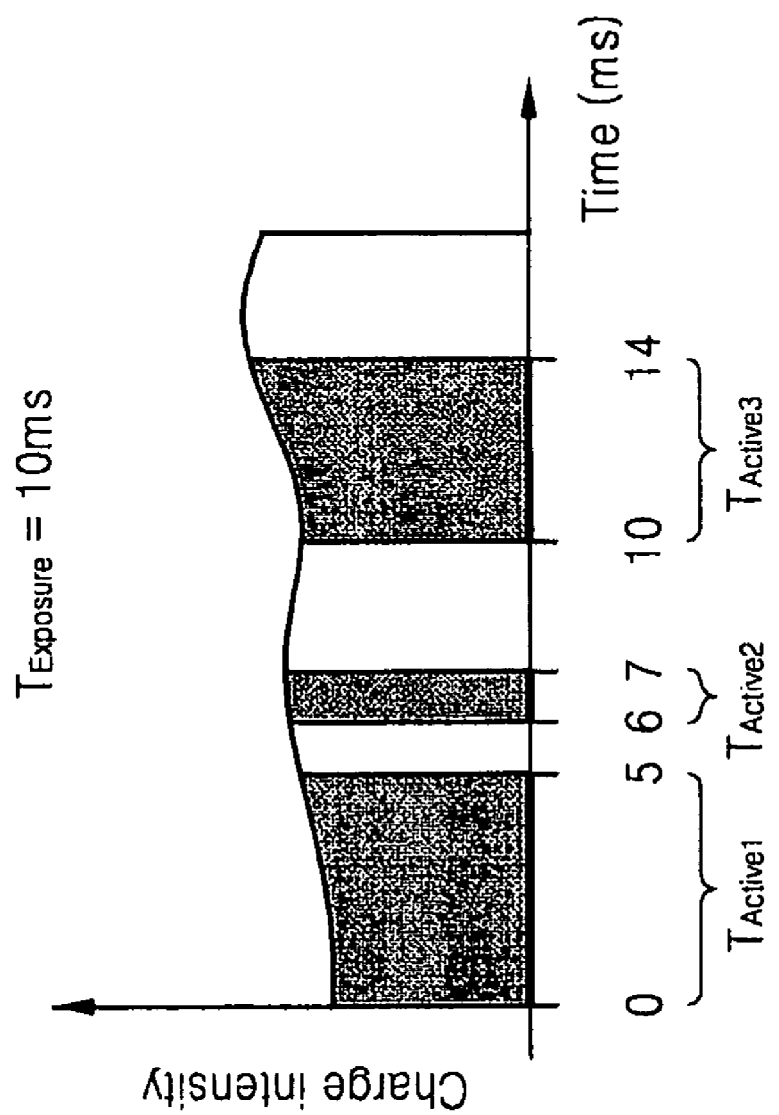

FIG. 4 illustrates an accumulated charge for a pixel according to example embodiments. The accumulated charge is obtained using the method illustrated in FIG. 3A.

As shown, an exposure time is the same as the exposure time shown in FIG. 1, which is 10 ms. However, the exposure time $T_{Exposure}$ is divided into three active time intervals $T_{Active1}$, $T_{Active2}$, and $T_{Active3}$, instead of one continuous period. Each pixel acquires charges during the active time intervals $T_{Active1}$ (0-5 ms), $T_{Active2}$ (6-7 ms), and $T_{Active3}$ (10-14 ms). The inactive time intervals are illustrated in the non-shaded areas, 5-6 ms and 7-10 ms. Moreover, the accumulated charge is the sum of the shaded areas.

Figure 5:
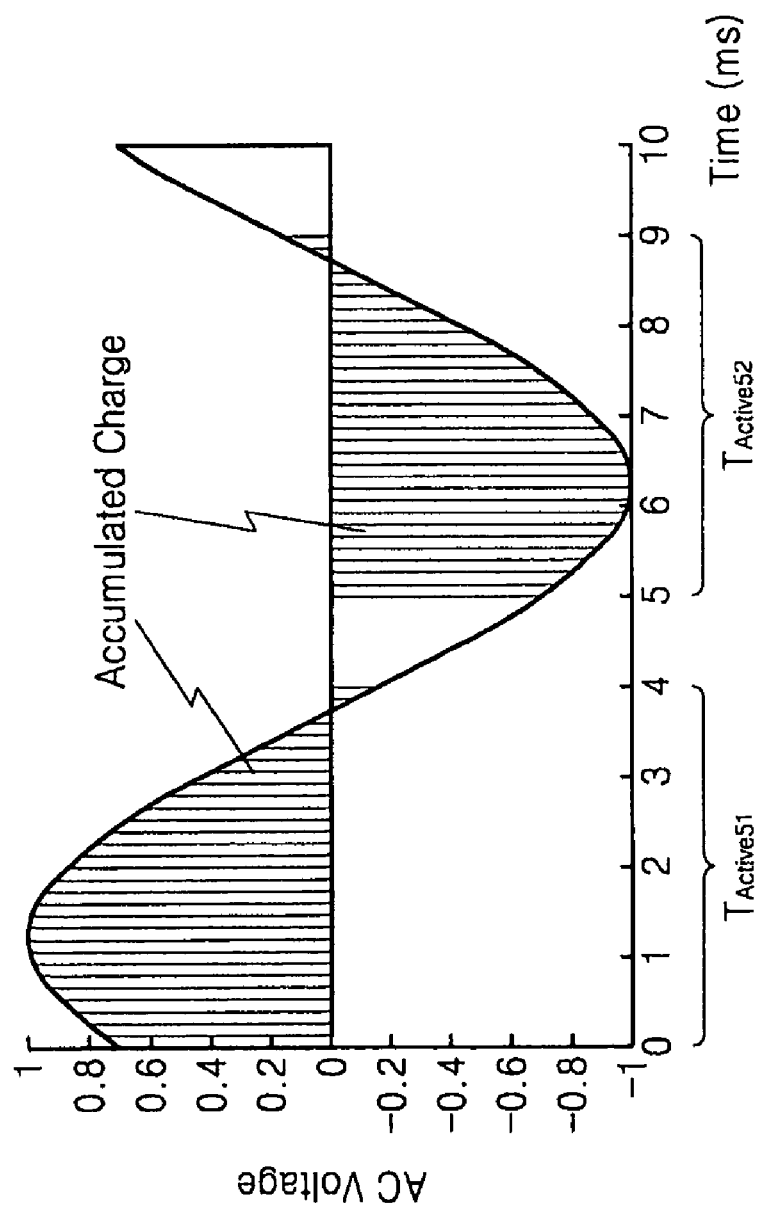

FIG. 5 illustrates an example of a 10 ms flicker period and an exposure time of 8 ms. The controller determines the exposure time of 8 ms. The flicker period is determined using any known method. As an example, an AC component of the artificial illumination is a sinusoid. However, it should be understood that the AC component may not be purely sinusoidal.

The controller of the image sensor divides the exposure time into two active intervals $T_{Active51}$ (0-4 ms shown in FIG. 5), $T_{Active52}$ (5-9 ms shown in FIG. 5), of 4 ms each with a (half-period) 5 ms shift. An integral of the AC voltage of the flicker artifact over the two active intervals $T_{Active51}$ and $T_{Active52}$ equals zero, independently on the sine wave phase. Therefore, when the controller in the image sensor sums the charge collected over the active time interval $T_{Active51}$ with the charge collected during the active time interval $T_{Active52}$, the accumulated charge will not be affected by the phase of the AC component of the artificial illumination.

More specifically, the exposure time is divided by the controller into two active time intervals to cancel out the AC component of the flicker artifact and to reduce a dependency on the phase of the AC component of the artificial illumination.

To further reduce dependency on the phase of the AC component of artificial illumination, the controller of the image sensor may divide the exposure time into more than two active time intervals, selected so as to cancel out the AC component of the signal. The controller may be programmed to use a fixed number of active time intervals, or the controller may be programmed to select a different number of active time intervals depending on statistics and system configuration (i.e., cost vs. benefit analysis).

Figure 6:
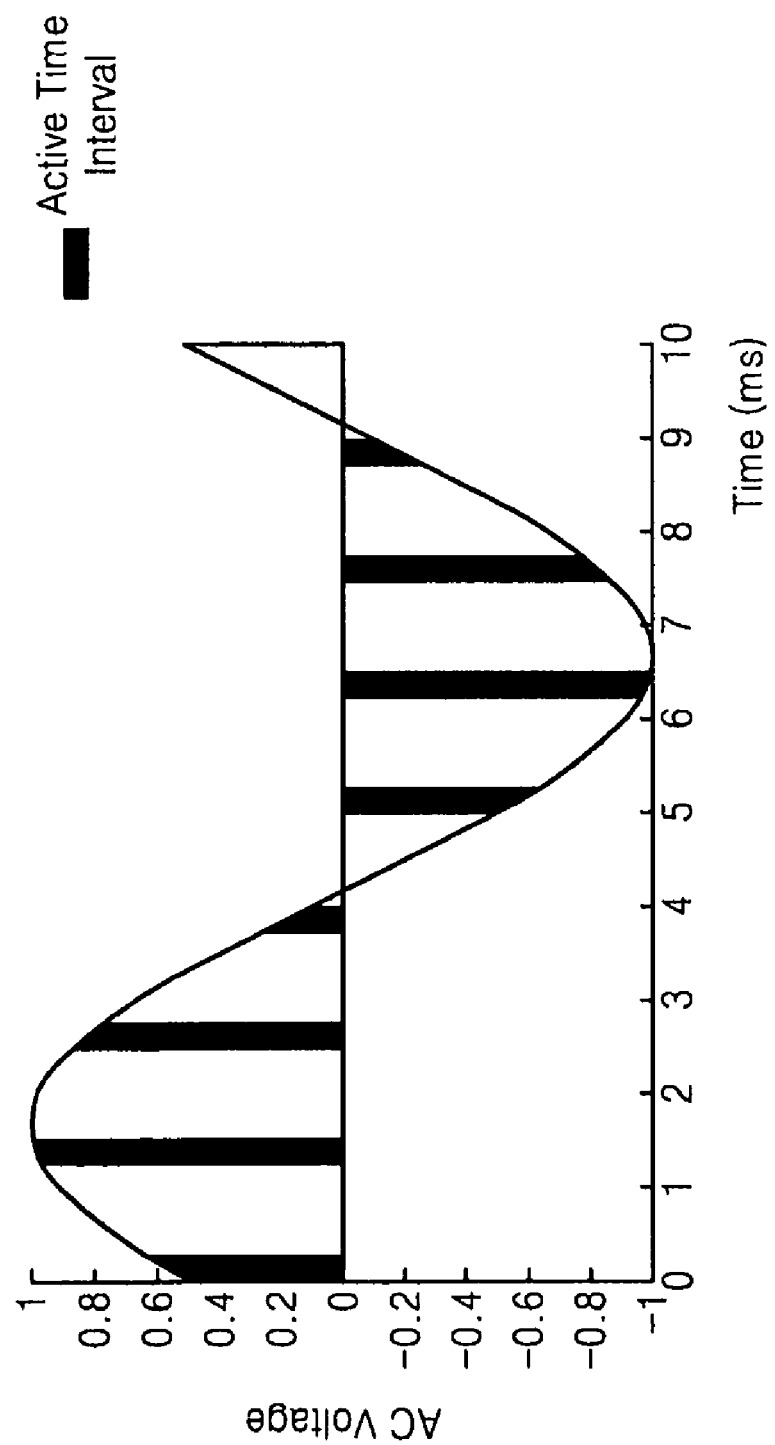

For example, FIG. 6 illustrates a subdivision of the exposure time into eight active time intervals, evenly distributed within a flicker period.

FIGS. 7A-7D illustrate a dependency of a pixel value (accumulated charge) on the phase of the AC component of artificial illumination source for different numbers of active time intervals according to example embodiments. An exposure time in FIGS. 7A-7D equals one millisecond.

Figure 7A:
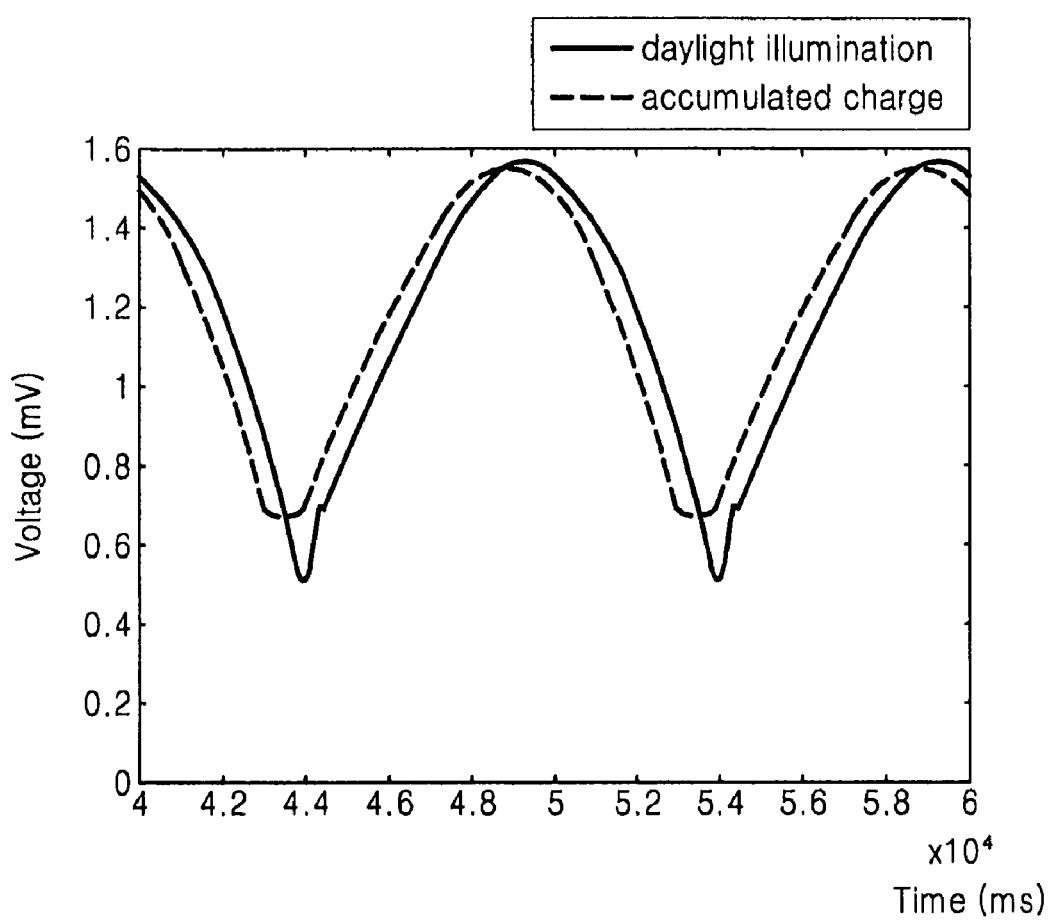
FIGS. 7A-7D illustrate a dependency of a pixel value (accumulated charge) on a phase of an AC component of artificial illumination source for different numbers of active time intervals according to example embodiments.
Figure 7B:
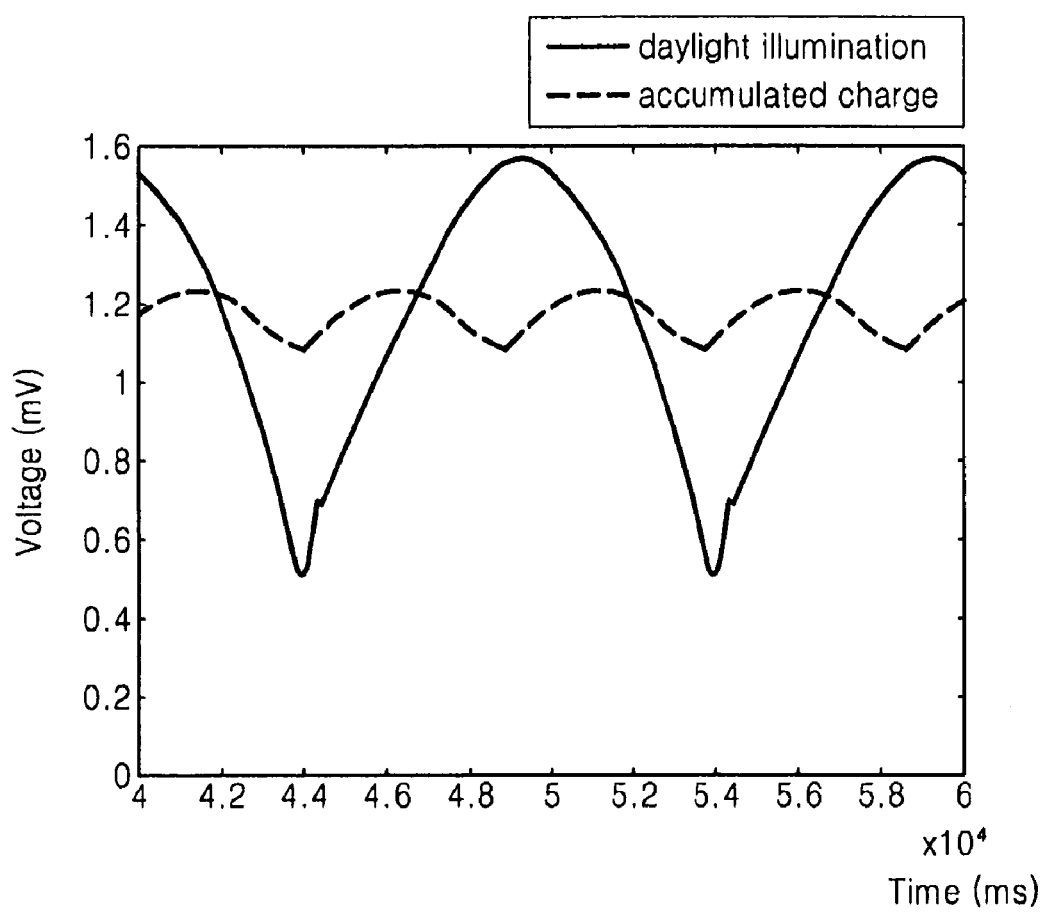
Figure 7C:
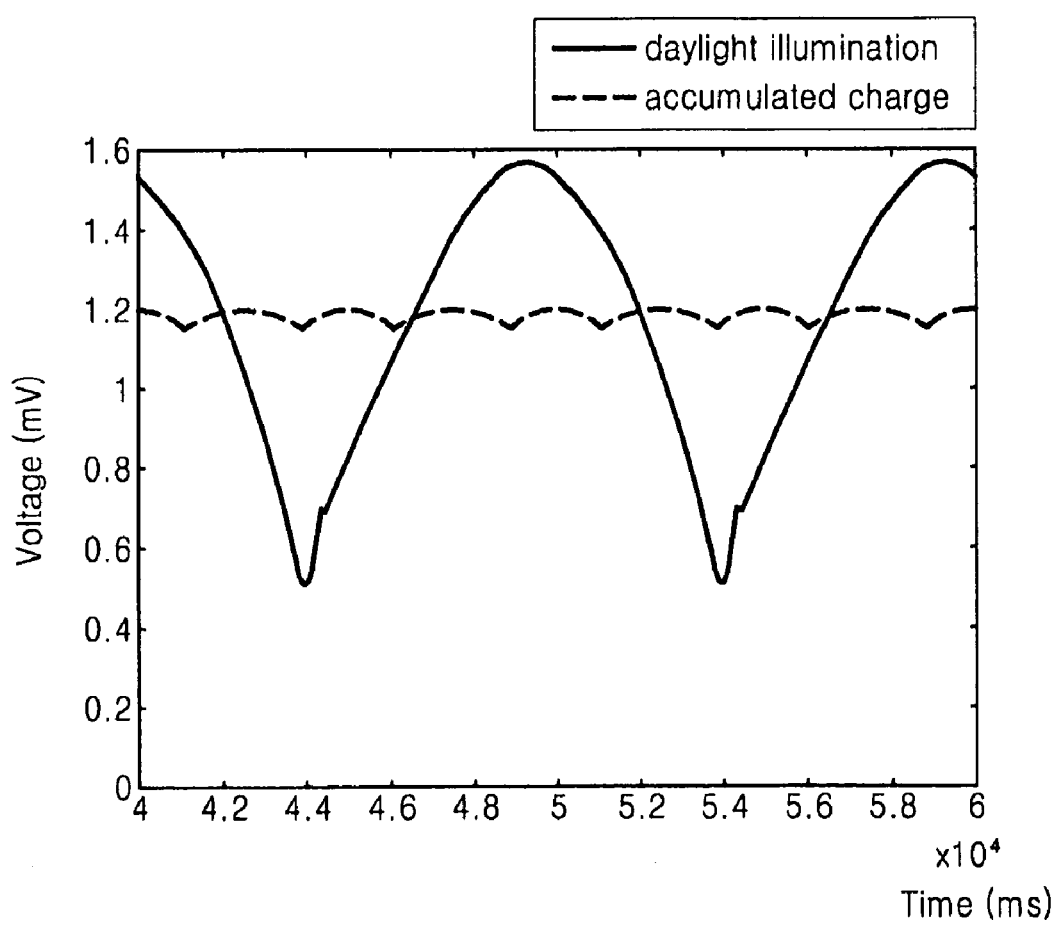
Figure 7D:
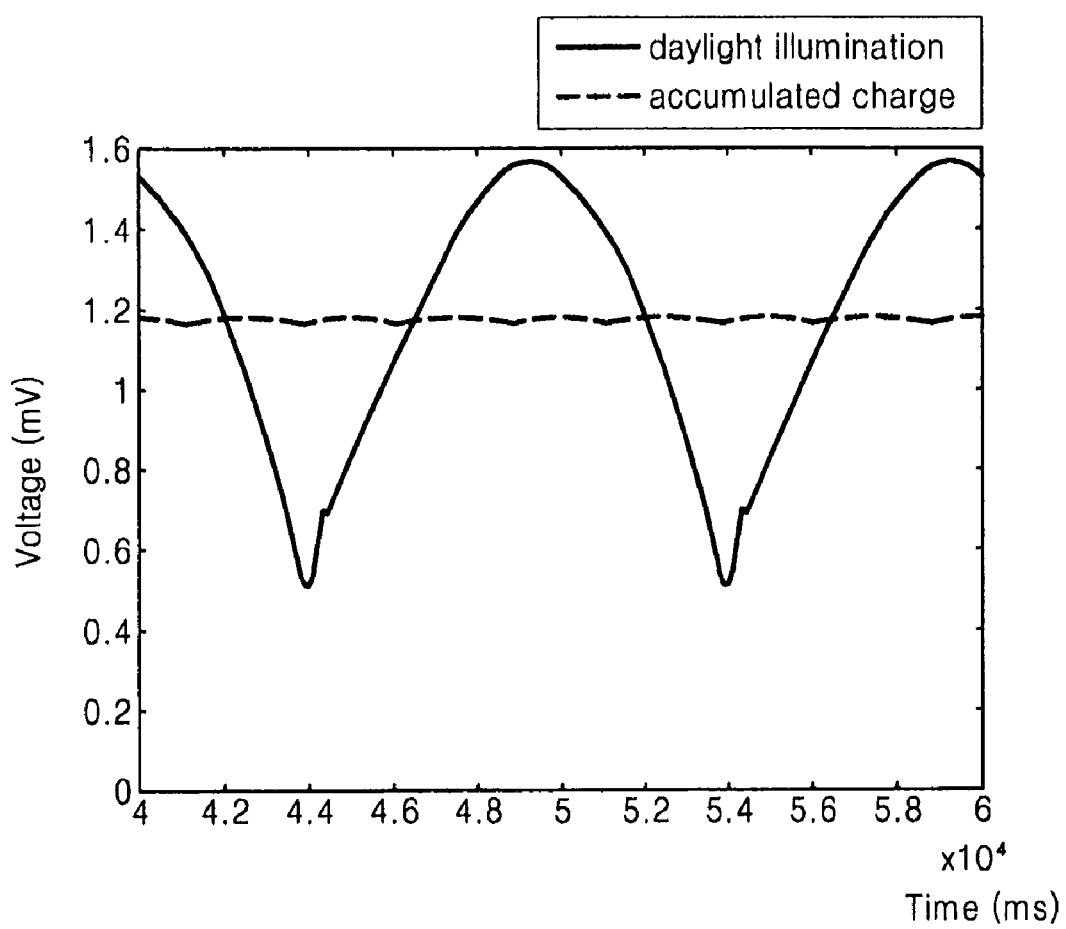

FIG. 7A illustrates an example when the charge is collected continuously for 1 ms. FIG. 7B illustrates an example when the charge is collected in two evenly distributed active time intervals of 0.5 ms each. FIG. 7C illustrates an example when the charge is collected in four evenly distributed active time intervals of 0.25 ms each. FIG. 7D illustrates an example when the charge is collected in eight evenly distributed active time intervals of 0.125 ms each.

A solid line in FIGS. 7A-7D is brightness under "daylight" fluorescent illumination. A dash-dot line in FIGS. 7A-7D is an integrated pixel value as a function of the point in time where the integration of the first sub-interval has started (it is a function of the value of the phase of AC component of artificial illumination source).

When there is no dependency on the flicker phase, the dash-dot line may be constant, since no residual AC component is present. As shown in FIG. 7D, the dependency on the flicker phase is minimal.

Overall, the dependency of an integrated pixel value on the flicker phase decreases based on an increasing number of active time intervals. Therefore, flicker artifact reduces as the number of active time intervals increases.

Figure 8A:
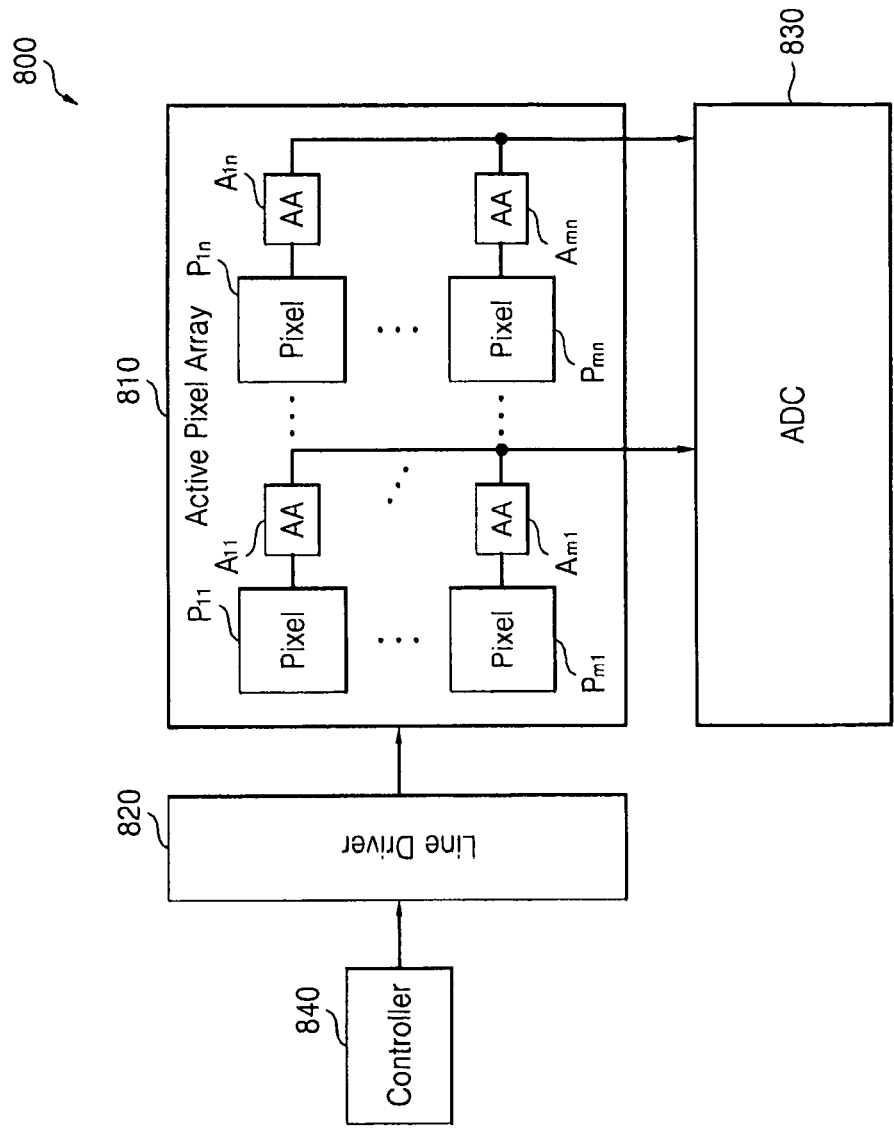
FIG. 8A illustrates an image sensor configured to implement methods of acquiring an image according to example embodiments.

FIG. 8A illustrates an image sensor configured to implement methods of acquiring an image according to example embodiments, such as the method illustrated in FIG. 3A. As shown, an image sensor 800 includes an active pixel array 810, a line driver 820, an analog-to-digital converter (ADC) 830 and a controller 840. The active pixel array 810 includes a plurality of pixels $P_{11}$-$P_{mn}$. An analog accumulator $A_{11}$-$A_{mn}$ is associated with each pixel $P_{11}$-$P_{mn}$. The analog accumulators $A_{11}$-$A_{mn}$ collect charges that are accumulated by the associated pixels $P_{11}$-$P_{mn}$ during each active time interval. The line driver 820 controls the active pixel array 810 by selecting a row of pixels (e.g., $P_{11}$-$P_{1N}$) for output.

The controller 840 determines the exposure time and active and inactive time intervals and inputs signals to the line driver 820 based on the determined exposure time and active and inactive time intervals. The controller 840 may include the timing unit 1106.

Each pixel $P_{11}$-$P_{mn}$ is configured to output charges to the associated analog accumulator $A_{11}$-$A_{mn}$. The pixels $P_{11}$-$P_{mn}$ collect charge during the active time intervals and transfer the accumulated charge to the analog accumulators $A_{11}$-$A_{mn}$ during an inactive time interval. The charges correspond to an amount of light received in the pixel.

Figure 8B:
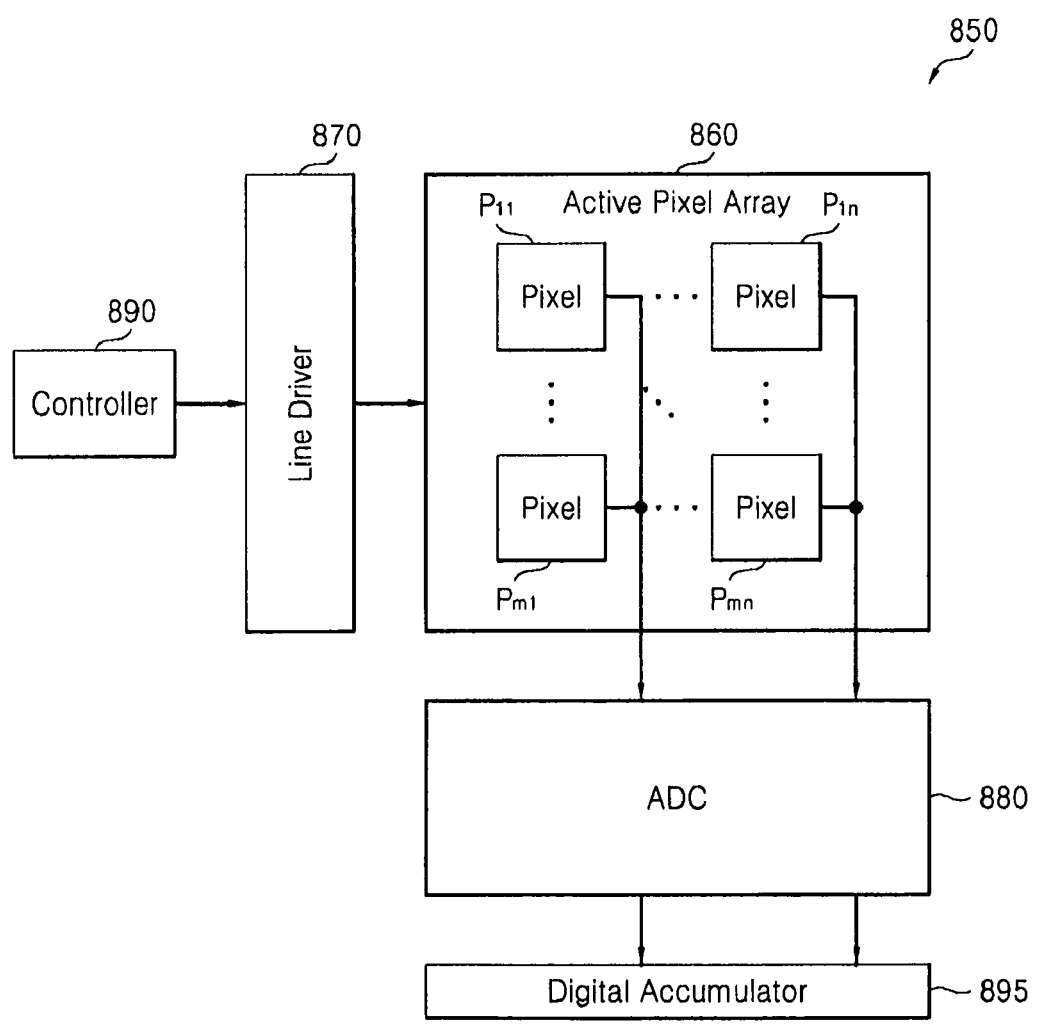
FIG. 8B illustrates another image sensor configured to implement methods of acquiring an image according to example embodiments.

FIG. 8B illustrates another image sensor configured to implement methods of acquiring an image with an image according to example embodiments, such as the method illustrated in FIG. 3A.

As shown, an image sensor 850 includes an active pixel array 860, a line driver 870, an analog-to-digital converter (ADC) 880 and a controller 890. The image sensor 850 operates in the same manner as the image sensor 800 except the image sensor includes a digital accumulator 895 instead of associated analog accumulators $A_{11}$-$A_{mn}$. The digital accumulator 895 includes a digital accumulator unit associated with each pixel $P_{11}$-$P_{mn}$ for summing digitized values of charges accumulated during each active time interval.

Multiple Exposure (ME)

FIG. 9A illustrates a method of acquiring a plurality of images in an image sensor according to an example embodiment. The method of FIG. 9A allows for production of a wide dynamic range image with significantly reduced motion artifact caused by inconsistency between images taken during an ME session. The method of FIG. 9A may be implemented by any image sensor configured for ME, such as the image sensors shown in FIGS. 8A and 8B.

At step S900, a controller of the image sensor determines an exposure time for each of a plurality of images. At step S900, the controller may also determine a number of the plurality of images, if the number has not already been programmed into the controller. For the purposes of clarity, N denotes a number of the plurality of images. Thus, the exposure times of N images may be denoted as $T_1$-$T_N$.

Once the exposure times are determined by the controller, the controller divides each exposure time into a plurality of time intervals at step S910. The controller may divide each exposure time in accordance with the method illustrated in FIG. 3A and, more specifically, step S310 illustrated in FIG. 3A. The controller divides the exposure times so that none of the time intervals overlap.

In the example illustrated in FIG. 9A, the controller divides each exposure time into M active intervals. Thus, for each exposure number k in $\{1, 2, \ldots, N\}$, $$T_k = T_k^1 + T_k^2 + \ldots + T_k^M \quad (5)$$

Consequently, since the exposure times do not overlap, total integration time required to capture N images equals $$T_1 + T_2 + \ldots + T_N \quad (6)$$

The controller divides the total integration time into contiguous intervals with lengths arranged in the following order: $T_1^1, T_2^1, \ldots, T_N^1, T_1^2, T_2^2, \ldots, T_N^2, \ldots, T_1^M, T_2^M, \ldots, T_N^M$.

Thus, the controller divides the total exposure time of each pixel into sub-intervals. The controller associates charge accumulated during the interval $T_k^m$ with the k-th image, as described below.

Figure 9B:
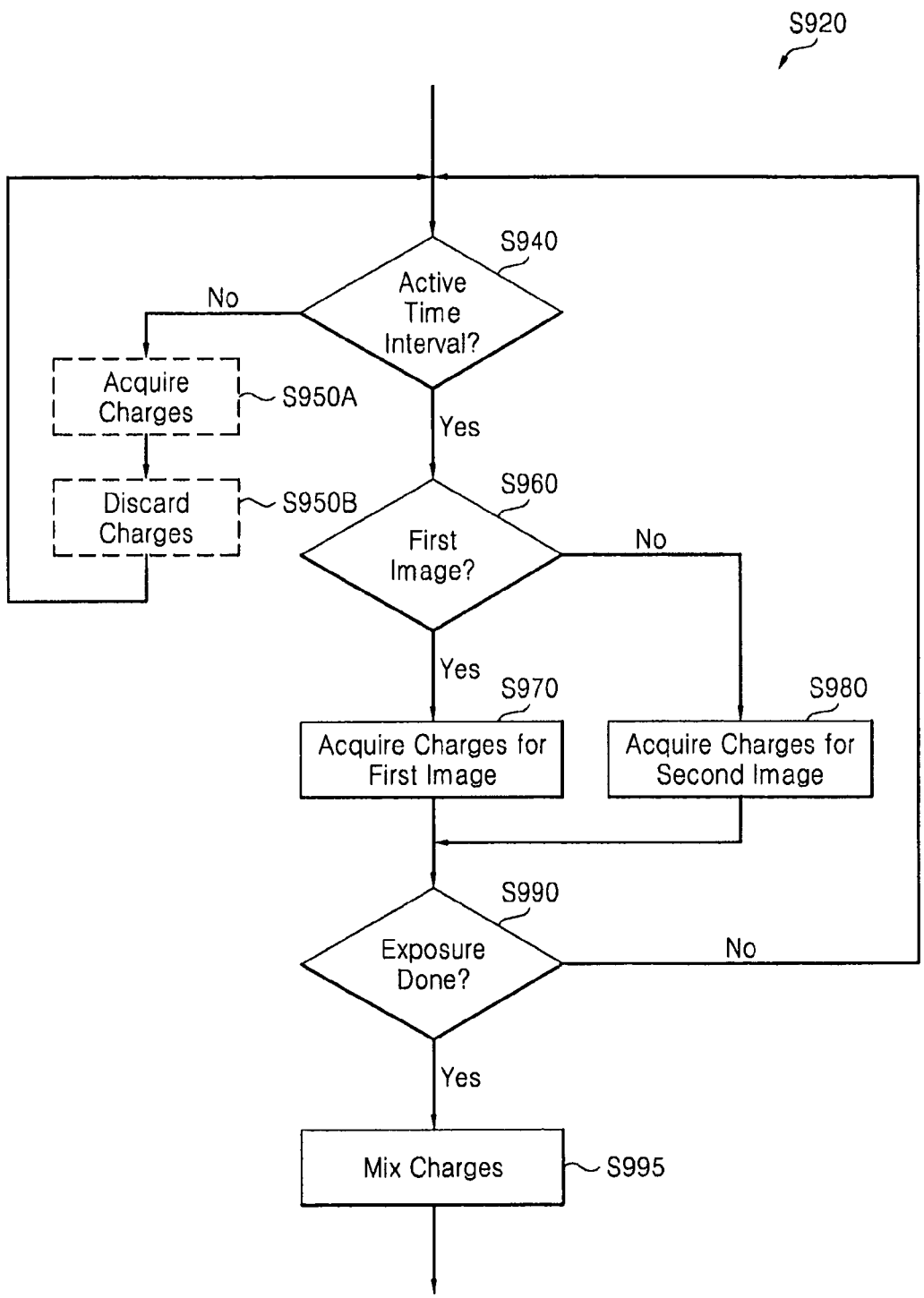
FIG. 9B illustrates an example embodiment of a step shown in FIG. 9A according to an example embodiment.

At step S920, the controller mixes the plurality of time intervals. An example embodiment of step S920 is illustrated in FIG. 9B. Once the plurality of time intervals are mixed, the controller finishes the method at step 930.

FIG. 9B illustrates an example embodiment of step S920 in more detail. Once the controller divides each exposure time into at least two active time intervals at step S910, the controller determines whether an interval is an active time interval at step S940. If the time interval is inactive, the pixel may not acquire charges and the method returns to step S940. Instead of not acquiring charges, the pixel may instead acquire charges at step S950A and discard the acquired charges at step S950B. Once the charges are discarded at step S950B, the method returns to step S940.

If the controller determines that the time interval is an active time interval for at least one of the images including an ME session at step S940, the controller determines whether the active time interval is for a first image (first exposure) of the plurality of images. If the active time interval is for the first image, the pixel acquires charges for the first image at S970. If the active time interval is not for the first image, then the pixel acquires charges for a second image at S980.

Each pixel is associated with an accumulator unit. The accumulator unit may be either analog or digital. Charges collected during the active time interval attributed to k-th image are added to the corresponding analog accumulator unit, or digitized and then added to the corresponding digital accumulator unit. Charges/digitized values can be preprocessed (e.g., denoised prior to adding them to accumulator). Charges/digitized values accumulated during the active time intervals attributed to k-th image are added together and their sum is a final charge/digital value collected by a pixel of the sensor for the k-th image. The controller interleaves the active time intervals for each image in time. This process is described in more detail in FIG. 10.

It should be understood that while FIG. 9B illustrates an example embodiment where a number of images equals two, example embodiments should not be limited to two images. FIG. 9B may be modified for any number greater than two images.

When the active time interval ends, the controller determines whether the exposure time is finished at step S990 (e.g., no time interval which is considered active by at least one of the images including the current ME session is located later in time than this specific active time interval). If the exposure time is not finished, the method returns to step S940. If the exposure is finished at step S990, the controller then mixes the accumulated charges for the first and second images at step S995. The controller may mix the charges for the first and second images using any known method.

The method then proceeds to step S930, where the method of FIG. 9A is done.

Figure 10:
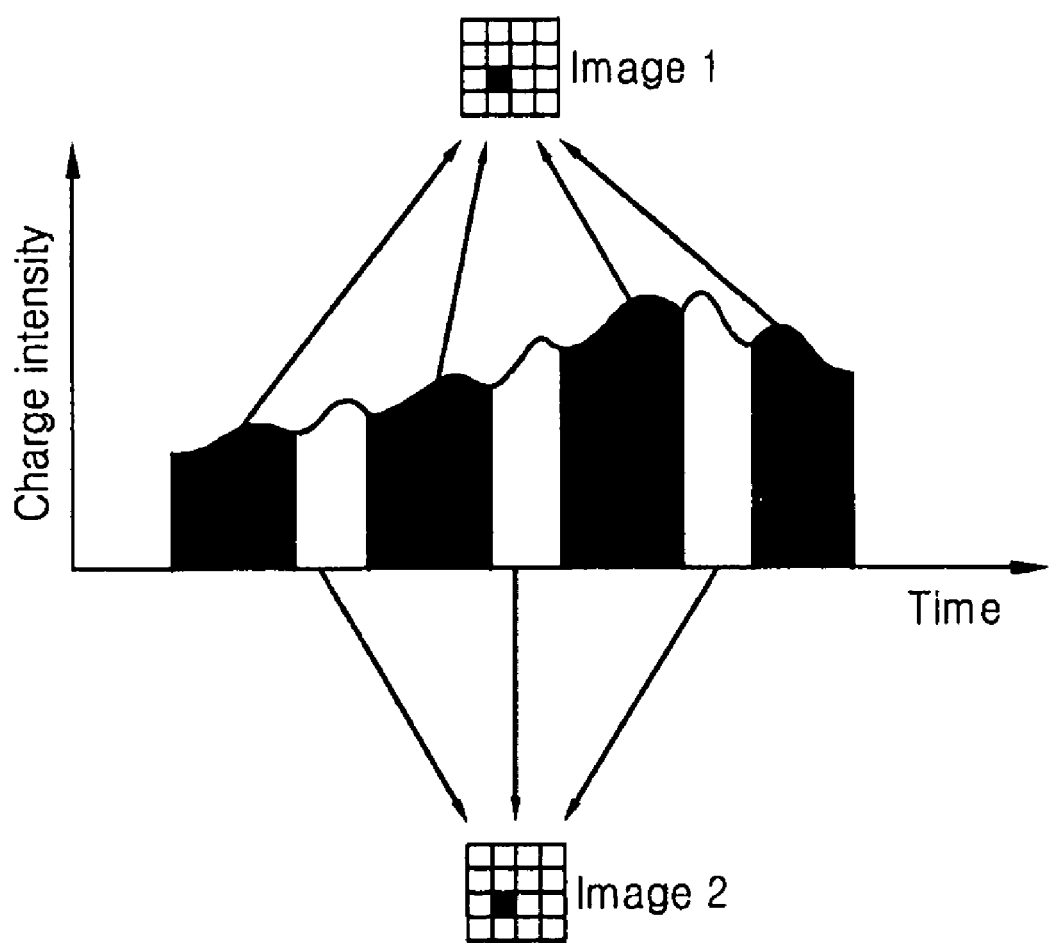

FIG. 10 illustrates an example embodiment where a number of the plurality of images is two. FIG. 10 illustrates an intensity of the charge generated over exposure time. The area under the graph is a total charge accumulated during the exposure time. The time axis is divided into non-overlapping intervals. During each interval, a charge is collected within the pixel. The charge collected during one interval is then attributed to one of the two resulting images. The total charge for one of the exposures (Image 1) is the sum of grayed areas under the graph, while the total charge for another exposure (Image 2) is the sum of non-grayed areas under the graph. Therefore, Image 1 and Image 2 are collected during multiple non-overlapping time periods instead of being collected during one contiguous time interval each, as in a conventional approach.

Example embodiments allow for the reduction of motion-induced spatial differences between N images taken during a single ME session as compared to a conventional approach of taking images in a sequence, since in the conventional approach, the time delay between starting exposure times of the first and second images was equal to an exposure time of the first image $T_1$, while in the proposed approach the time delay between the starting exposure times equals $T_1$, which is less than $T_1$ and could be made as small as needed.

It should be understood that different configurations of time intervals may exist. For example, it is possible to divide an exposure time of the k-th image into non-equal time intervals. It is also possible to divide the exposure times of different images into a different number of sub-intervals.

Figure 13:
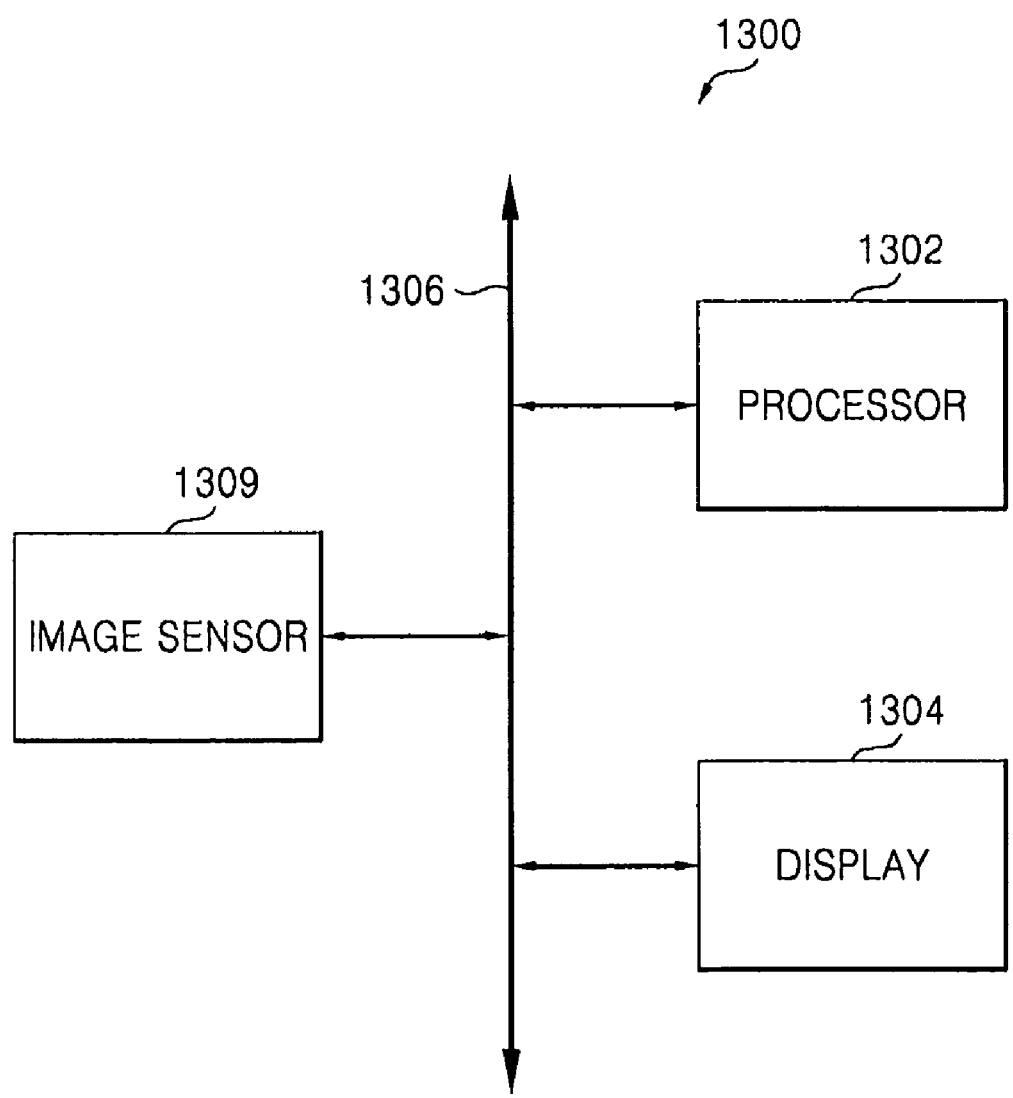

FIG. 13 is a block diagram illustrating an electronic system according to an example embodiment.

Referring to FIG. 13, a system 1300 includes a processor 1302, an image sensor 1301, and a display 1304 that communicate with each other via a bus 1306. The processor 1302 is configured to execute a program and control the electronic system. The image sensor 1300 is configured to capture image data by converting optical images into electrical signals. The image sensor 1300 may be an image sensor as described above with regard to FIGS. 8A and 8B. The processor 1302 may include the image signal processor 1108 shown in FIG. 11, and may be configured to process the captured image data for storage in a memory (not shown) and/or display by the display 1304. The electronic system may be connected to an external device (e.g., a personal computer or a network) through an input/output device (not shown) and may exchange data with the external device.

For example, the electronic system 1300 shown in FIG. 13 may embody various electronic control systems including an image sensor (e.g., a digital camera), and may be used in, for example, mobile phones, personal digital assistants (PDAs), laptop computers, netbooks, MP3 players, navigation devices, household appliances, or any other device utilizing an image sensor or similar device.

While example embodiments being described refer to active time intervals being separated evenly (e.g., equal inactive time intervals), it should be understood that the active time intervals may be unequal and/or separated by unequal inactive time intervals.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of acquiring a plurality of images in an image sensor, the method comprising:
   determining, by a controller of the image sensor, an exposure time for each of the plurality of images;
   dividing, by the controller, each exposure time into a plurality of time intervals; and
   mixing, by the controller, the plurality of time intervals, wherein
      the dividing divides each exposure time into at least two active time intervals, the at least two active time intervals being separated by at least one active time interval for another exposure time, and
      the at least two active time intervals are unequal intervals.

2. The method of claim 1, wherein the mixing mixes the plurality of time intervals to not overlap.

3. A method of acquiring a plurality of images in an image sensor, the method comprising:
   determining, by a controller of the image sensor, an exposure time for each of the plurality of images;
   dividing, by the controller, each exposure time into a plurality of time intervals; and
   mixing, by the controller, the plurality of time intervals, wherein
      the mixing mixes a first plurality of time intervals for a first exposure time with at least a second plurality of time intervals for at least a second exposure time,
      each of the first plurality of time intervals is separated from a next time interval of the first plurality of time intervals by a time interval of the at least second plurality of time intervals, and
      the dividing divides the first exposure time into the first plurality of time intervals, the first plurality of time intervals being unequal intervals.

4. The method of claim 3, wherein
   the dividing divides the first exposure time into the first plurality of time intervals and the at least second exposure time into the at least second plurality of time intervals, and
   a number of the first plurality of time intervals is different than a number of the at least second plurality of time intervals.

5. The method of claim 3, wherein
   the dividing divides the first exposure time into the first plurality of time intervals and the at least second exposure time into the at least second plurality of time intervals, and
   a number of the first plurality of time intervals is the same as a number of the at least second plurality of time intervals.

6. The method of claim 3, further comprising:
   first acquiring, by a pixel of the image sensor, charges during the first plurality of time intervals, a first image being based on the acquired charges during the first plurality of time intervals; and
   second acquiring, by the pixel, charges during the at least second plurality of time intervals, at least a second image being based on the acquired charges during the at least second plurality of time intervals.

7. A method of acquiring a plurality of images of a physical object with an image sensor, the method comprising:
   determining an exposure time for each of the plurality of images;
   dividing each exposure time into a plurality of time intervals;
   mixing the plurality of time intervals; and
   acquiring charges representing the physical object during the plurality of time intervals, wherein
      the dividing divides each exposure time into at least two active time intervals, the at least two active time intervals being separated by at least one active time interval for another exposure time, and
      the at least two active time intervals are unequal intervals.

8. The method of claim 7, wherein the mixing mixes the plurality of time intervals to not overlap.

9. A method of acquiring a plurality of images of a physical object with an image sensor, the method comprising:
- determining an exposure time for each of the plurality of images;
- dividing each exposure time into a plurality of time intervals;
- mixing the plurality of time intervals; and
- acquiring charges representing the physical object during the plurality of time intervals, wherein
  - the mixing mixes a first plurality of time intervals for a first exposure time with at least a second plurality of time intervals for at least a second exposure time,
  - each of the first plurality of time intervals is separated from a next time interval of the first plurality of time intervals by a time interval of the at least second plurality of time intervals, and
  - the dividing divides the first exposure time into a first plurality of time intervals, the first plurality of time intervals being unequal intervals.

10. The method of claim 9, wherein
the dividing divides the first exposure time into the first plurality of time intervals and the at least second exposure time into the at least second plurality of time intervals, and
a number of the first plurality of time intervals is different than a number of the at least second plurality of time intervals.

11. The method of claim 9, wherein
the dividing divides the first exposure time into the first plurality of time intervals and the at least second exposure time into the at least second plurality of time intervals, and
a number of the first plurality of time intervals is the same as a number of the at least second plurality of time intervals.

12. The method of claim 9, wherein the acquiring includes,
first acquiring charges during the first plurality of time intervals, a first image of the physical object being based on the acquired charges during the first plurality of time intervals, and
second acquiring charges during the at least second plurality of time intervals, at least a second image of the physical object being based on the acquired charges during the at least second plurality of time intervals.

* * * * *